Patented Apr. 4, 1944

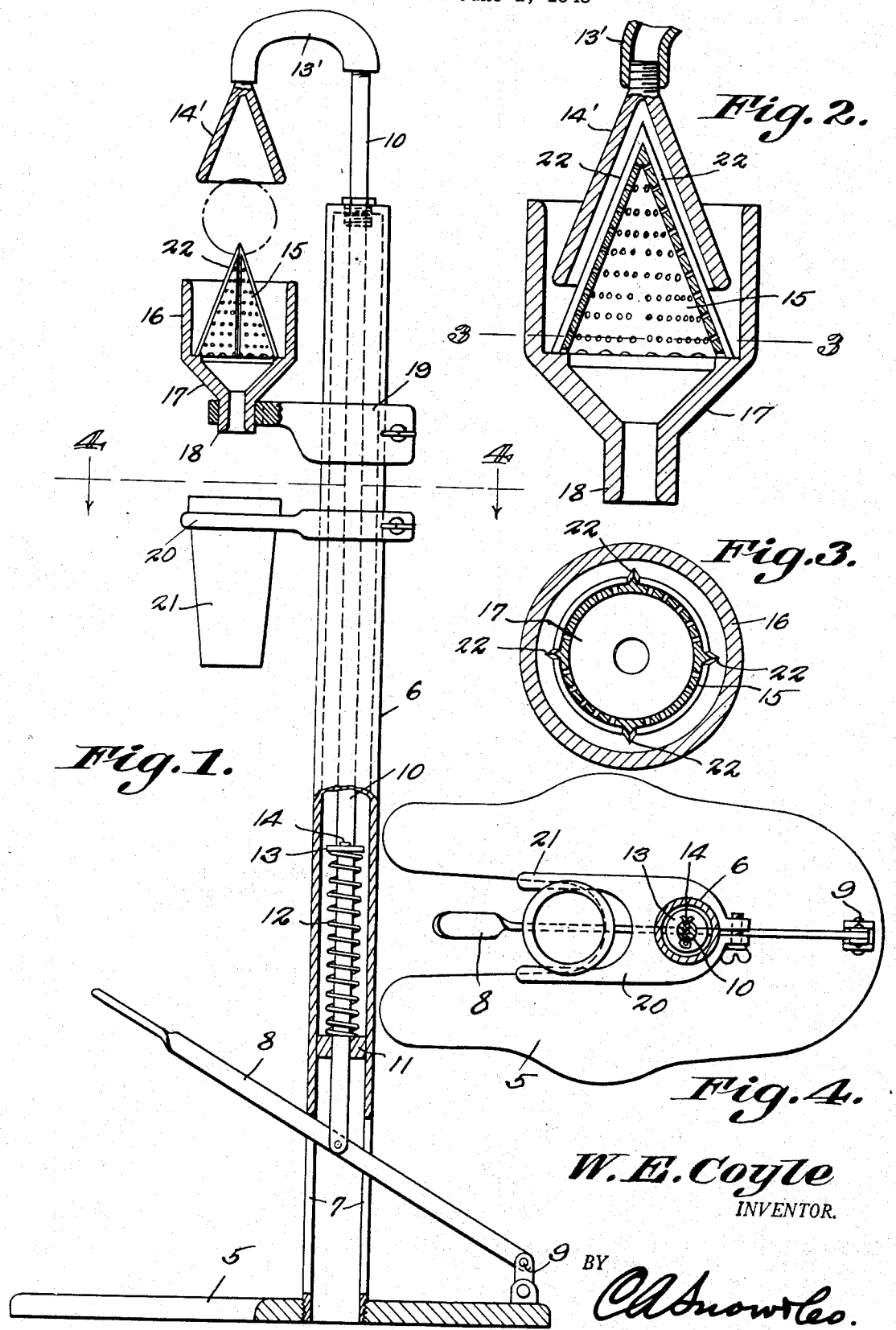
April 4, 1944. W. E. COYLE 2,345,731
FRUIT JUICE EXTRACTOR
Filed June 1, 1943
W. E. Coyle
INVENTOR.

2,345,731

UNITED STATES PATENT OFFICE 2,345,731

FRUIT JUICE EXTRACTOR

William Earl Coyle, Shreveport, La.

Application June 1, 1943, Serial No. 489,302

2 Claims. (Cl. 100—41)

This invention relates to citrus fruit squeezers or presses, an important object of the invention being to provide a device of this character which will operate to extract fruit juices from the whole fruit, eliminating the necessity of cutting the fruit in halves, prior to the pressing operation.

Another object of the invention is to provide a fruit squeezer or press, embodying a stand and a vertically movable plunger designed to press the fruit against a substantially cone-shaped head, provided with knives, so that the segments of the fruit will be cut, prior to the squeezing or pressing operation.

Still another object of the invention is to provide a stand wherein the movable plunger is operated by a treadle, leaving the operator's hands free to handle or dispose of the juice and rind of the fruit, during the juice extracting operation.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is a side elevational view of a fruit juice extractor, constructed in accordance with the invention.

Figure 2 is an enlarged sectional view through the extractor head and plunger.

Figure 3 is a sectional view taken on line 3—3 of Figure 2.

Figure 4 is a sectional view taken on line 4—4 of Figure 1.

Referring to the drawing in detail, the base of the stand is indicated by the reference character 5, and provides the support for the hollow standard 6, which is shown as rising therefrom.

The lower end of the standard 6 is formed with cutout portions 7 providing guides for the treadle 8 which is pivotally connected to the base 5, at 9.

Operating within the tubular standard 6, and having pivotal connection with the treadle 8, is the plunger rod 10, which operates through the bearing 11, mounted within the hollow standard 6, adjacent to the treadle 8. This bearing 11 also provides a stop against which one end of the coiled spring 12 rests, the coiled spring being positioned on the plunger rod 10, the upper end of the spring 12 bearing against the washer 13 secured on the plunger rod, by the pin 14. The action of the coiled spring is to normally urge the plunger rod upwardly which of course elevates the treadle for operation by foot pressure directed thereto by the operator.

Mounted on the upper end of the plunger rod 10, is the laterally extended arm 13' to which the cone-shaped plunger 14' is connected. It might be further stated that this cone-shaped plunger is of a diameter to set up a clamping action between the citrus fruit and the wall thereof, when the plunger is forced downwardly over the cone-shaped presser head 15.

The support for the cone-shaped presser head 15, is indicated by the reference character 16 and is provided with a funnel-shaped bottom 17, the lower reduced extension 18 thereof being held in an opening of the adjustable supporting arm 19. Because of the structure of the supporting arm, it will be seen that the support 16 may be readily and easily removed and replaced, facilitating the cleaning of the device.

Directly below the arm 19, is a vertically adjustable supporting arm 20, which is formed with an opening to receive the glass or container 21 into which the fruit juices fall, as they pass through the support 16.

The presser head 15 is constructed in such a way that whole fruit may be treated to extract the juice therefrom, and comprises a cone-shaped body portion, constructed of sheet metal material formed with circular lines of perforations spaced apart, throughout the entire surface thereof.

Blades indicated at 22 are formed on the outer surface of the head 15, and are spaced an equal distance apart, the blades extending from the lower end of the head to the apex thereof, where the blades merge into a sharp point designed to pierce the fruit and hold the fruit in direct alignment with the plunger 14 to insure a uniform pressure being directed to the fruit for the complete extraction of the juices thereof.

In the operation of the device, the fruit from which the juices are to be extracted, is positioned on the presser head 15, in a manner as shown in dotted lines in Fig. 1 of the drawing. The operator now presses the treadle 8 downwardly, with the result that the cone-shaped plunger grips the fruit and forces it downwardly over the presser head 15, the knives operating to cut the pulp, while the pressure directed to the fruit, causes the juices to be forced through the perforations of the head, from where they pass into the receptacle 21.

Since the operation of the device is accomplished by foot pressure directed to the treadle 8, it will be seen that the operator's hands are free to remove the receptacle or container 21 to empty the contents thereof.

What is claimed is:

1. A fruit juice extractor, comprising a support, a plunger rod mounted for vertical movement within the support, a treadle to which one end of the plunger rod is connected, a hollow cone-shaped plunger carried at the upper end of the plunger rod, a supporting arm adjustably mounted on the support, a hollow support on said arm, a hollow cone-shaped presser head mounted in the hollow support and having knives extending longitudinally of the outer surface thereof, said knives merging into a point at the upper end of the presser head, said point adapted to pierce fruit and hold the fruit in position on the presser head, said cone-shaped plunger adapted to engage the fruit on the presser head and force the fruit over said presser head extracting the juices therefrom, as the treadle is moved downwardly, and means for receiving the fruit juices from the presser head.

2. A fruit juice extractor comprising a vertical support, a treadle operated plunger rod operating in the support, a plunger at the upper end of the rod and supported laterally of the rod, a cone-shaped presser head mounted under said plunger, said head having circular lines of perforations arranged therein and disposed in spaced relation with respect to each other, blades extending longitudinally of the outer surface of said presser head and merging into a point at the apex of the presser head, said plunger adapted to move fruit downwardly over said presser head, squeezing the juice therefrom, and a container supported under the presser head to receive juice therefrom.

WILLIAM EARL COYLE.